No. 656,107.　　　　　　　　　　　　　　　Patented Aug. 14, 1900.
H. W. GRABER.
MECHANISM FOR CLEANING SEED COTTON.
(Application filed June 19, 1900.)
(No Model.)
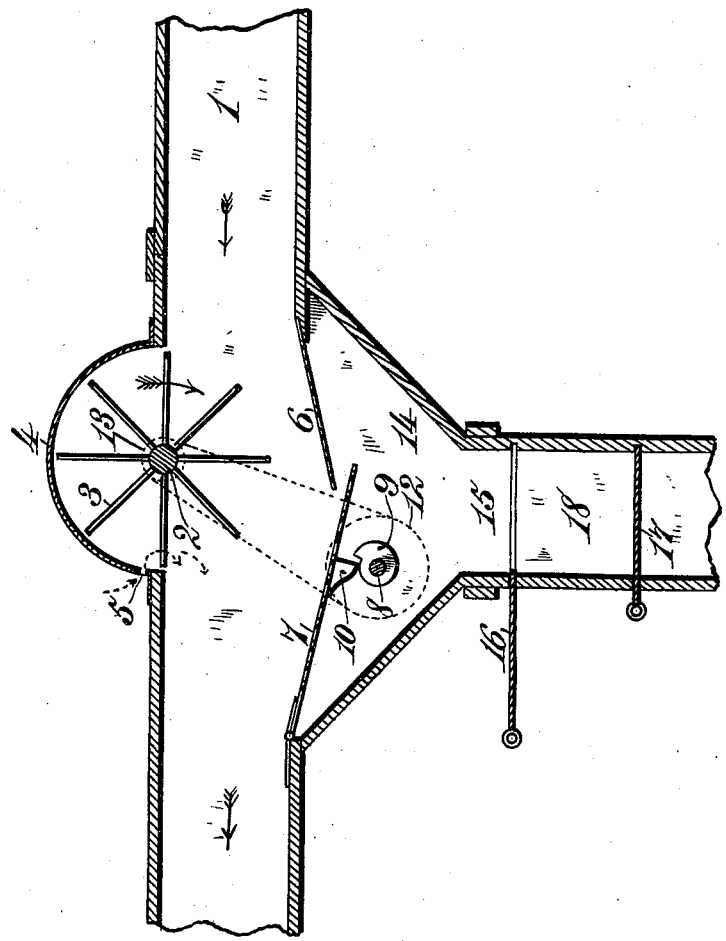
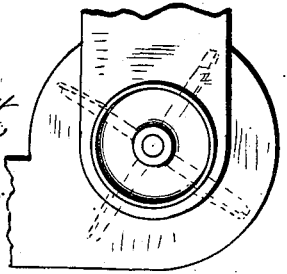
Witnesses.
Inventor,
Henry W. Graber,
By James L. Norris.
Att'y.

UNITED STATES PATENT OFFICE.

HENRY W. GRABER, OF DALLAS, TEXAS.

MECHANISM FOR CLEANING SEED-COTTON.

SPECIFICATION forming part of Letters Patent No. 656,107, dated August 14, 1900.

Application filed June 19, 1900. Serial No. 20,871. (No model.)

*To all whom it may concern:*

Be it known that I, HENRY W. GRABER, a citizen of the United States, residing at Dallas, in the county of Dallas and State of Texas, have invented new and useful Improvements in Mechanism for Cleaning Seed-Cotton, of which the following is a specification.

My invention relates to mechanism for cleaning seed-cotton.

It is my purpose to provide a machine of this kind which shall be more simple in the construction and arrangement of its parts and more efficient in operation than machines of the same type now in general use.

It is my object also to provide a cotton-cleaner of such construction that the following operative results will be fully and perfectly accomplished—viz., that no obstruction or impediment of any kind whatever shall be offered to the movement of the cotton and air-current in the conduit, whereby the cotton shall be thoroughly beaten while in the conduit, the dust, dirt, and trash, as well as substances of much greater weight and size—such as nails, stones, and other foreign material found in seed-cotton—shall be wholly removed from it and collected in a separate receptacle, and whereby also the cotton in its passage through the conduit shall be uniformly and effectually loosened and dried and then distributed with regularity to the gin-feeders, which deliver it to the gin-roll boxes ready for the gin-saws, thus insuring a much better sample, especially in those cases in which the cotton is in a damp and matted condition.

I also aim to provide an extremely simple construction whereby the ends of the beater-arms acting upon the cotton shall be stripped of any adhering portions of the fiber by an air-current, which carries the cotton through the conduit without diminishing the efficiency of the air-elevator in any degree. I make a suitable provision also by means of the construction last referred to for preventing the cotton from passing the beater-arms and going up into the cover which incloses said arms.

It is my object to so organize the mechanism that it can be operated by a low motive power and to so construct and arrange its several parts that the apparatus when installed can be placed in almost any part of the ginning-house without inconvenience and without interfering with other mechanism.

My invention also comprises other novel and useful features, which will be explained, together with the features already referred to, in the course of the following description, and then particularly pointed out and defined in the claims at the end of the same.

For the purposes of the following description reference is had to the accompanying drawing, in which the figure is a vertical longitudinal section of a portion of a conduit equipped with my invention.

The reference-numeral 1 in said drawing indicates the cotton conduit or conveyer, only a portion of which is shown. It is constructed of wood or other material in the usual manner and the cotton is moved therein by an air-current, the direction of which is denoted by the arrows. This current is produced by a fan of the ordinary construction, and the air-current at the point shown is a suction or exhaust in contradistinction to a forced blast.

At the point shown in the conduit which is between the telescoping portion and the cotton-elevator I arrange a shaft 2, substantially in the plane of the upper side of the conduit and transverse to the latter. This shaft has rigid beater-arms 3, which are revolved in the direction shown by the arrows. They are inclosed under a semicircular top or cover 4, which rises above the upper side of the conduit, the ends of said arms running quite near the inner face of the cover, which is closed save for a narrow air-inlet 5 between the edge of the lid or cover 4 and the top wall of the cotton-conduit. The purpose of this opening will be explained presently.

In the lower wall of the conduit, beneath the beater, I interpose a two-part screen, one portion of which (denoted by the numeral 6) is rigid and has a moderate inclination downward in the same direction that the cotton and air-current move. The other part 7 of said screen has an opposite and substantially-equal inclination downward, its lower edge passing underneath the lower edge of the part 6, while its other edge is hinged or flexibly connected to the wall of the conduit. Beneath this section is arranged a shaft 8, carrying a scroll-cam 9, on which rests a lug 10, projecting from the lower face of the screen. The throw of this cam is such that at each turn it lifts the hinged screen just far enough to close or nearly close the opening between its upper face and the edge of the rigid section 6. The shaft 8 is provided upon one end, which projects through and beyond the side wall of the conduit, with a sprocket-wheel or friction-pulley 12, which is geared to a sprocket-wheel or friction-pulley 13 on the shaft 2, so that the beater-arms are revolved in unison with the vibration of the hinged section 7 of the screen.

Beneath the two portions 6 and 7 of the screen is a hopper-shaped chamber 14, leading to a vertical chute 15 beneath it. At or near the upper end of the chute is a slide 16, which cuts the entrance of air, and thereby maintains the partial exhaust in the conduit. At a suitable point below the slide 16 is a second slide 17, the space between the two constituting a dust-chamber or receptacle 18 for any foreign matter in the seed-cotton. During the active operation of the cotton-cleaner the upper slide 16 is drawn out to allow any substances beaten out of the cotton and thrown upon the vibrating screen 7 to descend into the chamber 18, where they are retained by the slide 17, which also cuts off the entrance of air. When said chamber is filled, the slide 16 is pushed in above its contents and the slide 17 is drawn out, whereby the accumulated refuse is allowed to pass down the chute, by which it is conducted to any suitable point and there discharged. The chute 15 is preferably carried through the floor of the ginning-house, and the lower slide 17 is located just above the level of the floor.

The mechanism described can be driven by any form of motor. In practical operation the shaft 2 is revolved in such a direction that the beater-arms will turn in the conduit in the same direction as the air-current, but at a higher speed. It will be observed that by the arrangement of parts shown the shaft 2 is wholly withdrawn from the interior of the conduit, so that it is no obstruction to the passage of the cotton. As the beater-arms 3, carried by said shaft, turn in the same direction that the cotton moves, but at a greater speed than the latter, they assist the cotton in its passage. At the same time they thoroughly beat it up and loosen the fiber and throw any foreign substances therein that might threaten the integrity of the gin-saws down upon the vibrating section 7 of the screen, over which they pass downward, expedited by the vibration, and fall into the dust-chamber 18. The opening between the edge of the rigid section 6 of the screen and the upper face of the vibrating section 7 is sufficient to allow the heavier substances liable to be contained in seed-cotton to pass into the chamber 18. The strong current of air drawn into the conduit through the opening 5 strips the ends of the beater-arms 3 of any adhering portions of cotton and prevents small particles thereof from passing up into the top of the cover 4. This current of air also keeps the ends of said arms 3 free from dirt. This air-inlet 5 is upon the edge of the cover next to the cotton-elevator, so that the air entering through it flows over the ends of the arms 3 as the latter move upward. The approximate course of the air is indicated in the drawing by dotted-line arrows.

By the arrangement described the cotton-conduit is relieved of any possible obstruction to the passage of the cotton, the movement of which is assisted by the beater-arms without in any degree impairing the efficiency of their operation in removing foreign substances from the cotton, loosening it up uniformly to permit the penetration of air, by which damp cotton will be thoroughly dried, and beating out any matted portions and preparing the whole for the action of the gin-saws.

Having thus described my invention, what I claim, and desire to secure by Letters Patent of the United States, is—

1. In a mechanism for cleaning seed-cotton, the combination with a conduit, of a shaft carrying beater-arms and arranged out of the interior space of said conduit, a lid or cover rising above the top wall of said conduit to inclose said beater-arms, and means for revolving the latter in the same direction of movement with the air-current, but at a higher speed, substantially as described.

2. In a mechanism for cleaning seed-cotton, the combination with a conduit, of a shaft arranged in the plane of the upper wall of said conduit and carrying beater-arms, a semicircular cover over the arms having an air-inlet opening between the edge of said cover and the wall of the conduit on the side on which the ends of said arms move upward to pass into the cover, and means for driving said arms in the same direction with the air-current in the conduit but at a higher speed, substantially as described.

3. In a mechanism for cleaning seed-cotton, the combination with a conduit of a beater-shaft arranged out of the interior thereof and having arms which move in said conduit in the same direction with the air-current, a two-part screen in the lower wall of said conduit beneath the beater, one section of said screen being rigid and inclined downward and the other section being flexibly connected to the lower wall and inclined to pass below the lower edge of the rigid section, and means for vibrating said screen, substantially as described.

4. In a mechanism for cleaning seed-cotton, the combination with a conduit, of a beater-shaft arranged in the plane of and transverse to the top wall of the conduit, a cover over said shaft and its arms having upon one edge an air-inlet, a two-part screen below said beater-shaft consisting of a rigid and a vibrating section inclined from the lower wall of the conduit downward, the vibrating section passing under the edge of the rigid section, means for vibrating said section toward and from the lower edge of the rigid section and for driving the beater-arms at a greater speed than the air-current in the conduit and in the same direction, a dust-chamber beneath the screen, and two slides therein one over the top and the other at the bottom of said chamber, substantially as described.

In testimony whereof I have hereunto set my hand in presence of two subscribing witnesses.

HENRY W. GRABER.

Witnesses:
L. R. CABELL,
M. L. SAMMONS.